Aug. 9, 1966  M. J. BALOG  3,264,878
AUTOMATIC GLASS AREA MEASURING DEVICE
Original Filed July 6, 1962  2 Sheets-Sheet 1

INVENTOR.
MICHAEL J. BALOG
BY Oscar H. Spencer
ATTORNEY

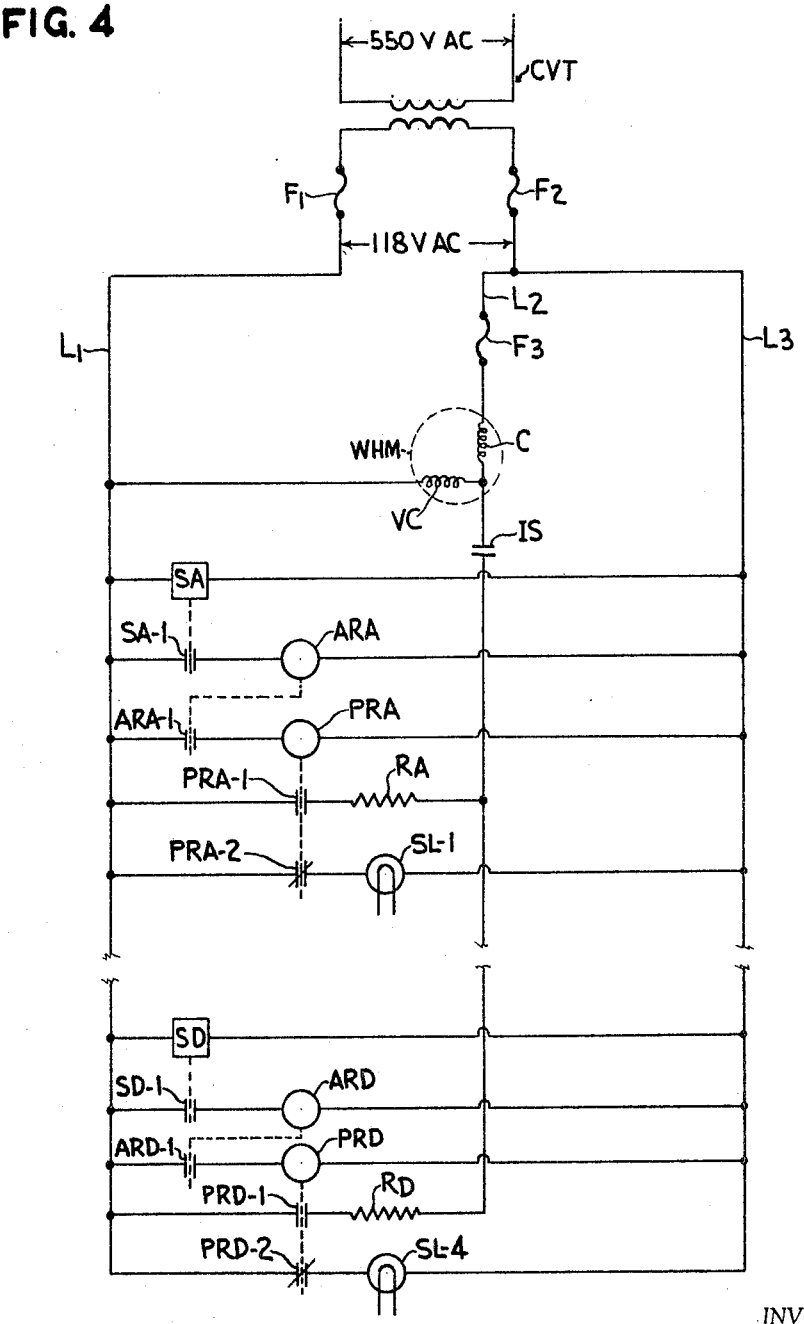

United States Patent Office 3,264,878
Patented August 9, 1966

3,264,878
AUTOMATIC GLASS AREA MEASURING DEVICE
Michael J. Balog, New Kensington, Pa., assignor to Pittsburgh Plate Glass Company, Pittsburgh, Pa., a corporation of Pennsylvania
Continuation of application Ser. No. 207,976, July 6, 1962. This application Oct. 7, 1965, Ser. No. 495,026
1 Claim. (Cl. 73—432)

This application is a continuation of a copending application, Serial No. 207,976, filed July 6, 1962, for Automatic Glass Area Measuring Device.

This invention relates to an automatic glass area measuring device and, more specifically, to a device for automatically measuring the area of glass sheets or a glass ribbon as it is conveyed past a reference plane.

The present invention is adapted to measure the area of a ribbon or sheets of flat glass as it is conveyed through the normal manufacturing, fabricating or handling processes without interrupting the material flow and, in the preferred embodiment to be hereinafter described, without contacting or otherwise marring the glass product.

Briefly, this is accomplished by dissipating electrical energy in response to the presence of, and in direct relationship to, the quantity of glass being conveyed past a reference plane. The total energy dissipated in response to the presence and quantity of glass passing the reference plane is electrically measured. This measurement may be correlated with the conveyor speed and the width of the glass sheets or ribbon to compute the total area of glass conveyed beyond the reference plane or, alternatively, the instrument may be calibrated in terms of the known conveying speed and glass width to automatically measure the total glass quantity in terms of area units.

Most advantageously, the presence of the glass being conveyed past a reference plane may be sensed by means of a plurality of ultrasonic switches spaced in a common plane transversely of the path of glass travel. These switches, without contacting the glass, may be individually actuated by the presence of the glass as it passes between an upper and lower unit of each switch. Through suitable relay circuitry, hereinafter to be described in more detail, these switches energize an associated resistor which dissipates power supplied from a constant voltage transformer. The energy dissipated by each resistor is integrated by a watthour meter which records the total power dissipated in terms of the glass area units in which it is calibrated. By utilizing a plurality of switches across the width of the conveying path, a close approximation of the actual area of glass traversing the reference plane may be obtained, notwithstanding irregularities in the shape of the glass sheets. As the trailing end of each glass sheet passes beyond the actuating switches, associated relays deenergize the energy-dissipating resistors and the recording meter stops. To insure that the meter does not record if a sheet of glass should stop between the sensors, an interlock switch is provided to disconnect the meter when the conveyor stops. A light in the circuit of each senser provides a further safeguard by indicating any improper functioning thereof.

The attendant advantages of this invention and the various embodiments thereof will be readily appreciated as the same become better understood by reference to the following detailed description when considered in connection with the accompanying drawings in which:

FIG. 4 is a schematic drawing of electrical circuitry used in the apparatus.

Figure 1:
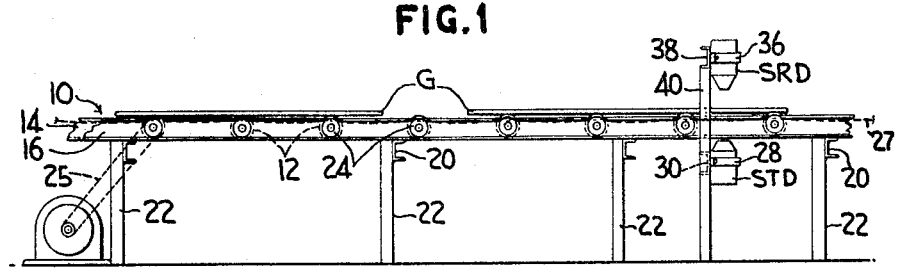
FIG. 1 is a schematic, elevation view showing a conventional roller conveyor conveying sheets of glass past ultrasonic sensing units which sense the presence of the glass sheets.

The apparatus of the present invention comprises a conveyor indicated generally at 10 having a plurality of horizontally aligned conveying rolls 12 supported by spaced parallel channel members 14 and 16 extending longitudinally of the path of travel. The rollers 12 are suitably journaled for rotation in bearings 18. Longitudinally extending channels 14 and 16 are cross braced by transverse channels 20 and supported in spaced relationship from the floor by stanchions 22. Sprockets 24, fastened to one end of each conveying roll 12, are driven in unison by a constant-speed drive electric motor 26 through conventional chain drives 25 and 27.

Four ultrasonic sensing switches SA, SB, SC and SD, each of which includes a transmitter STA, STB, STC and STD and a receiver SRA, SRB, SRC and SRD are positioned below and above, respectively, the plane of support for the glass defined by the upper periphery of horizontally aligned conveying rolls 12. These switches are located intermediate two adjacent conveying rolls and are generally horizontally aligned in a vertical plane extending transversely of the conveyor parallel to the conveying rolls. The switches are spaced at predetermined intervals across the width of the conveying path. Each transmitter, located beneath the support plane, is suitably fastened, as by brackets 28 to a transversely extending channel member 30 suitably supported by vertical beams 40 and 41.

Ultrasonic receivers SRA, SRB, SRC and SRD are located above the support plane defined by rollers 12 and are in direct vertical alignment with their corresponding transmitters STA, STB, STC and STD. The receivers are supported in a similar manner to the transmitters by suitable brackets 36 fastened to a transversely extending channel 38 above the conveyor which is supported by vertical supports 40 and 41.

In operation, and with particular reference to FIG. 4, a constant voltage transformer CVT applies a constant voltage of 118 volts-A.C. across lines $L_1$ and $L_2$ and across lines $L_1$ and $L_3$. The circuit is properly fused, as at $F_1$, $F_2$ and $F_3$. Ultrasonic switches SA, SB, SC and SD, operating at 38,000 cycles per second, are connected in parallel between line $L_1$ and $L_3$ and are comprised of transmitter portions STA, STB, STC and STD and receiver portions SRA, SRB, SRC and SRD. These switches are in a normally open position as long as the sound beams from the transmitters are received by the receivers. Only the circuitry for switches SA and SD is shown inasmuch as the circuitry for each switch is identical and the actual number of switches used is governed by such practical considerations as conveyor width, costs, and accuracy required with respect to irregularly shaped glass sheets.

The starting of conveyor driving motor 26 closes a normally open interlock switch IS in a manner well known in the art. The purpose of this switch is to prevent the watthour meter from recording any dissipation of energy in response to the actuation of the ultrasonic switches should the conveyor not be moving and a sheet of glass be positioned between the transmitter and receiver of the ultrasonic switches.

As the leading edge of a sheet of glass being conveyed by the rotation of conveying rollers 12 reaches the vertical plane in which the switches SA, SB, SC and SD are aligned, some or all, depending upon the shape and width of the glass sheets, of the switches are actuated by the interruption of the ultrasonic beam.

Figure 2:
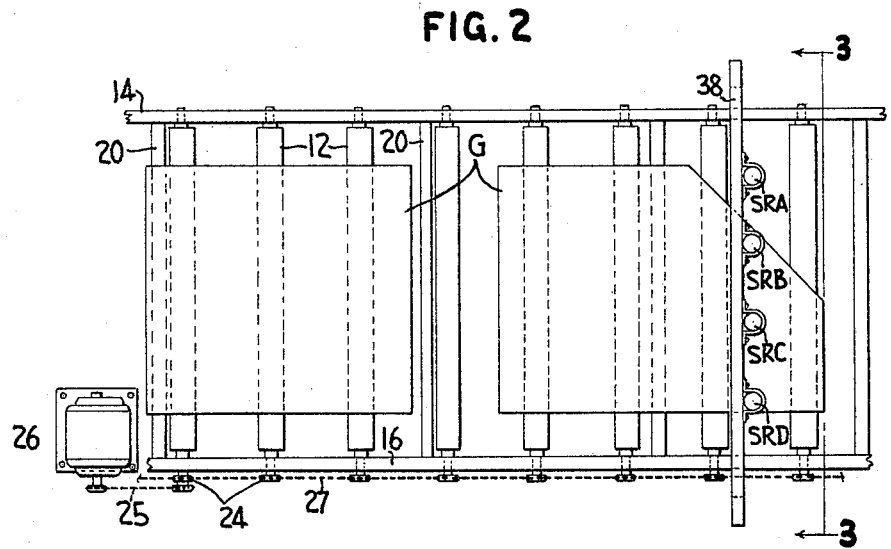
FIG. 2 is a partial, schematic, plan view of the conveyor and sensing units.
Figure 3:
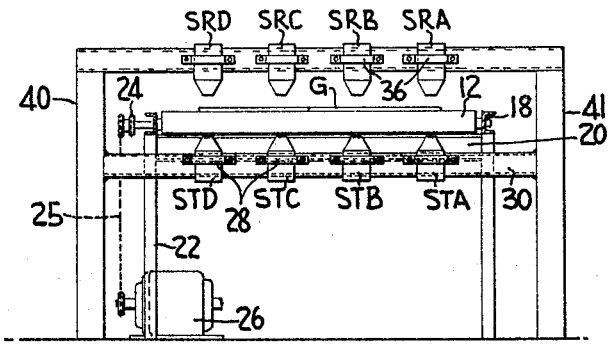
FIG. 3 is an end elevation of the conveyor showing upper and lower sensing units and is taken along the line 3—3 of FIG. 2.

The interruption of the ultrasonic beam of any switch SA, SB, SC, or SD closes an associated, normally open contact SA–1, SB–1, SC–1 and SD–1. Thus, when a sheet of glass of a shape and in the position shown in FIG. 2 interrupts the sound beam of switches SB, SC and SD, contacts SB–1, SC–1 and SD–1 close, thereby respectively energizing amplifier relays ARB, ARC and ARD in series therewith. Because the sound beam of ultrasonic switch SA has not yet been interrupted, amplifier relay ARA is not energized. The energization of amplifier relays ARB, ARC and ARD close their associated, normally open contacts ARB–1, ARC–1 and ARD–1 which are each in series with a power relay PRB, PRC and PRD, respectively. In this manner power relays PRB, PRC and PRD are energized, each of which closes an associated pair of normally open contacts PRB–1, PRB–2, PRC–1, PRC–2, PRD–1 and PRD–2.

Current now flows from constant voltage transformer CVT through lines $L_1$ and $L_2$ through now closed contacts PRB–1, PRC–1 and PRD–1, through resistors $R_B$, $R_C$ and $R_D$ in series therewith, through now closed interlock switch IS, and through the current coil C and voltage coil VC of watthour meter WHM.

Watthour meter WHM, in response to the voltage across voltage coil VC and in response to the current now flowing through current coil C, records the total energy dissipated through resistors $R_B$, $R_C$ and $R_D$.

Because conveyor drive motor 26 is operated at a constant speed, the flow of glass across the reference plane in which the switches SA through SD are located proceeds at a constant speed and hence the total length of the glass which passes the reference plane is time dependent. Because the energy dissipated, and hence recorded on watthour meter WHM, is also time dependent, that is, dependent upon the time during which any one of switches SA through SD are actuated, the contribution to the total meter reading made by each resistor $R_A$ through $R_D$ is representative of a linear length of glass.

Because the width of glass represented by each spaced switch SA through SD is known, the contribution of each resistor $R_A$ through $R_D$ to the total watthour meter reading is proportional to a known width as well as to a time measured length of the glass, and hence is indicative of the area of the glass which passes said switch. If the watthour meter is calibrated in terms of the known constant conveyor speed, the reading of the meter will be a direct indication of the total area of glass which has passed past the reference plane.

Upon the energization of power relays PRB, PRC and PRD, associated, normally closed contacts PRB–2, PRC–2 and PRD–2 in series with signal lights SL2, SL3 and SL4, respectively, are opened, causing the signal lights to turn off, indicating that energy is being dissipated through resistors $R_B$, $R_C$ and $R_D$, respectively. Because ultrasonic switch SA has not yet been actuated because of the shape of the glass sheet being measured, amplifier relay ARA and power relay PRA are not energized and, hence, normally closed contact PRA–2 remains closed, thus leaving signal light SL1 energized.

At some later time as the glass sheet advances past the sensing switches, the beam of switch SA will be interrupted by the glass sheet G and will energize resistor $R_A$ and turn off signal light SL1 in the manner previously explained in connection with switches SB, SC and SD. Resistor $R_A$ will then dissipate energy, and the rate at which the watthour meter indicates glass area passing by the reference plane will increase proportionally.

As the trailing edge of the glass sheet passes beyond the reference plane in which switches SA through SD are aligned, the ultrasonic beam transmitted from transmitters STA, STB, STC and STD is again received by receivers SRA, SRB, SRC and SRD, allowing contacts SA–1 through SD–1 to return to their normally open position. This deenergizes amplifier relays ARA through ARD in series with said contacts and opens contacts ARA–1 through ARD–1. This, in turn, deenergizes power relays PRA through PRD, allowing normally open contacts PRA–1, PRB–1, JRC–1 and PRD–1 to open and allowing normally closed contacts PRA–2, PRB–2, PRC–2 and PRD–2 to close. Current flow through associated resistors $R_A$ through $R_D$ is thereby interrupted and, at the same time, signal lights SL1 through SL4 are energized to indicate that current is not flowing through the associated resistors. Because electrical energy is no longer being dissipated, the watthour meter ceases operation, notwithstanding the continuous operation of the conveyor.

While the above-described embodiment is illustrative of this invention, in many instances it will be possible to alter the arrangement or constituents or substitute equivalents therefor to obtain substantially the same result in substantially the same way.

In particular, it will be evident that this invention is not limited to the measurement of glass sheet and ribbon area, but is equally applicable to the measurement of sheet or ribbon area of other materials, such as paper, plastic, fabric, metal, wood, etc.

It will also be evident that the use of the ultrasonic switches described above provide certain advantaegs, inasmuch as they permit the sheet to be sensed without physically contacting the material and hence can cause no damage thereto, for example, even if the glass is at elevated temperatures and hence deformable by physical contact.

The particular number of ultrasonic switches is dependent upon the conveyor width, the variety of shapes of glass sheets to be conveyed, and upon the accuracy of the measurement that is desired. Thus, if the leading edges or trailing edges are round or angularly disposed relative to the longitudinal path of travel, a greater number of switches assures a more complete and accurate integration of actual glass area and, in addition, provides more accurate measurement if different widths of glass are to be conveyed.

It should be evident from the above section, therefore, that while in the foregoing disclosure certain preferred embodiments of the invention have been disclosed, numerous modifications or alterations may be made therein without departing from the spirit and scope of the invention as set forth in the appended claim.

I claim:

In a method of measuring the area of glass in sheet and ribbon form that is conveyed along a predetermined path and passes a reference plane intersecting said path, the steps comprising conveying the glass at a predetermined speed past said reference plane, directing ultrasonic signals from a plurality of ultrasonic transmitters spaced across said reference plane through the path of glass travel toward a corresponding plurality of receivers, receiving signals from said plurality of transmitters in the absence of glass passing said reference plane opposite a receiver, blocking signals directed across the reference plane by moving glass along said predetermined path past said reference plane, dissipating electrical energy only when said glass is being conveyed and in response to and proportional to the ultrasonic signals blocked by the moving glass, measuring the total quantity of energy dissipated in response to blocked signals and correlating the quantity with the predetermined speed of glass travel to determine the area of glass that has passed said reference plane.

References Cited by the Examiner

UNITED STATES PATENTS

| | | | |
|---|---|---|---|
| 2,617,197 | 11/1952 | Derby | 33—123 |
| 2,630,043 | 3/1953 | Kolisch | 88—14 |
| 3,042,899 | 7/1962 | Kendall et al. | |
| 3,108,032 | 10/1963 | Carlson | 156—361 |

RICHARD C. QUEISSER, *Primary Examiner*.